United States Patent [19]

Smith et al.

[11] 4,175,405

[45] Nov. 27, 1979

[54] SHAFT COUPLING

[75] Inventors: Joseph F. Smith; Joseph R. Smith, both of Greensboro, N.C.

[73] Assignee: PEM-IMS, Inc., N.C.

[21] Appl. No.: 832,185

[22] Filed: Sep. 12, 1977

[51] Int. Cl.² .................. F16D 3/48; F16D 3/00
[52] U.S. Cl. .................................. 64/10; 64/6; 403/341
[58] Field of Search .................. 64/10, 24, 9 R, 6; 403/341

[56] References Cited

U.S. PATENT DOCUMENTS

| | | | |
|---|---|---|---|
| 1,610,758 | 12/1926 | Downer | 64/10 |
| 2,948,128 | 8/1960 | Smith | 64/10 |
| 2,972,240 | 2/1961 | Wood | 64/10 |
| 3,473,261 | 10/1969 | Sheckells | 64/10 |
| 3,606,407 | 9/1971 | Pendergast | 403/341 |
| 3,643,642 | 2/1972 | Junes | 64/10 |
| 3,905,207 | 9/1975 | Garrison | 64/10 |

FOREIGN PATENT DOCUMENTS

| | | | |
|---|---|---|---|
| 88164 | 2/1957 | Denmark | 64/10 |
| 2229886 | 5/1974 | France | 64/10 |

*Primary Examiner*—Charles J. Myhre
*Assistant Examiner*—R. C. Turner

[57] ABSTRACT

A shaft coupling having cooperatively spaced split collars mounted in juxtaposition and releasably locked to each other and to shaft ends for non-axial displacement of a shaft end.

3 Claims, 1 Drawing Figure

SHAFT COUPLING

BACKGROUND, ADVANTAGES AND OBJECTIVES OF THE INVENTION

In various types of machinery including textile machines of various types the shafts are divided into sections and couplings are provided to join the shaft sections each to the other. Bearings are provided to support the shafts at suitable intervals. Frequently the shafts may become distorted or worn or the bearings require replacement. Disassembling the couplings and the shafts has usually necessitated removing the shafts or shaft sections horizontally thereby requiring the removal in the entire assembly of a series of shafts which have been positioned and aligned satisfactorily resulting in increased downtime and increased maintenance costs.

In certain applications, a series of interconnected or coupled shafts have been aligned after considerable effort and suitably coupled. Should one of the shaft sections require maintenance, even after a relatively short period of time due to some failure, the entire shaft with its various sections or components must be removed and the couplings disconnected in order to remove the shaft section that requires replacement. One section normally may not be removed without disturbing the alignment and positioning of adjacent shaft sections. Alignment must be performed again after replacement of the defective shaft section.

Therefore, it is contemplated by the utilization of the present shaft coupling that individual shaft sections may readily be replaced while maintaining the remainder of the shaft sections in place and in alignment without disturbance while the shaft section that is defective for any reason may be replaced.

A further objective of this improved shaft coupling is the provision of a series of removable collars which support and interlock with adjacent shaft collars that may be readily removed to permit the transverse displacement of the shaft section to be removed without disturbing the adjacent shaft sections.

Yet a further objective of this improved shaft coupling is the provision of a coupling in which a minimum number of components may be utilized that are interchangeable and which are suitable for transmitting the requisite rotational forces from one shaft section to the other while maintaining the original alignmentof the shaft sections adjacent to the shaft section that is to be replaced which will facilitate the alignment and installation of the shaft section to be replaced.

Other objectives and many of the attendant advantages of this improved shaft coupling will become more readily apparent to those skilled in the machine art from the accompanying drawing and detailed description and there is no intention to limit the claims to the specific embodiment disclosed.

DETAILED DESCRIPTION OF A PREFERRED EMBODIMENT OF THE INVENTION

Figure 1:
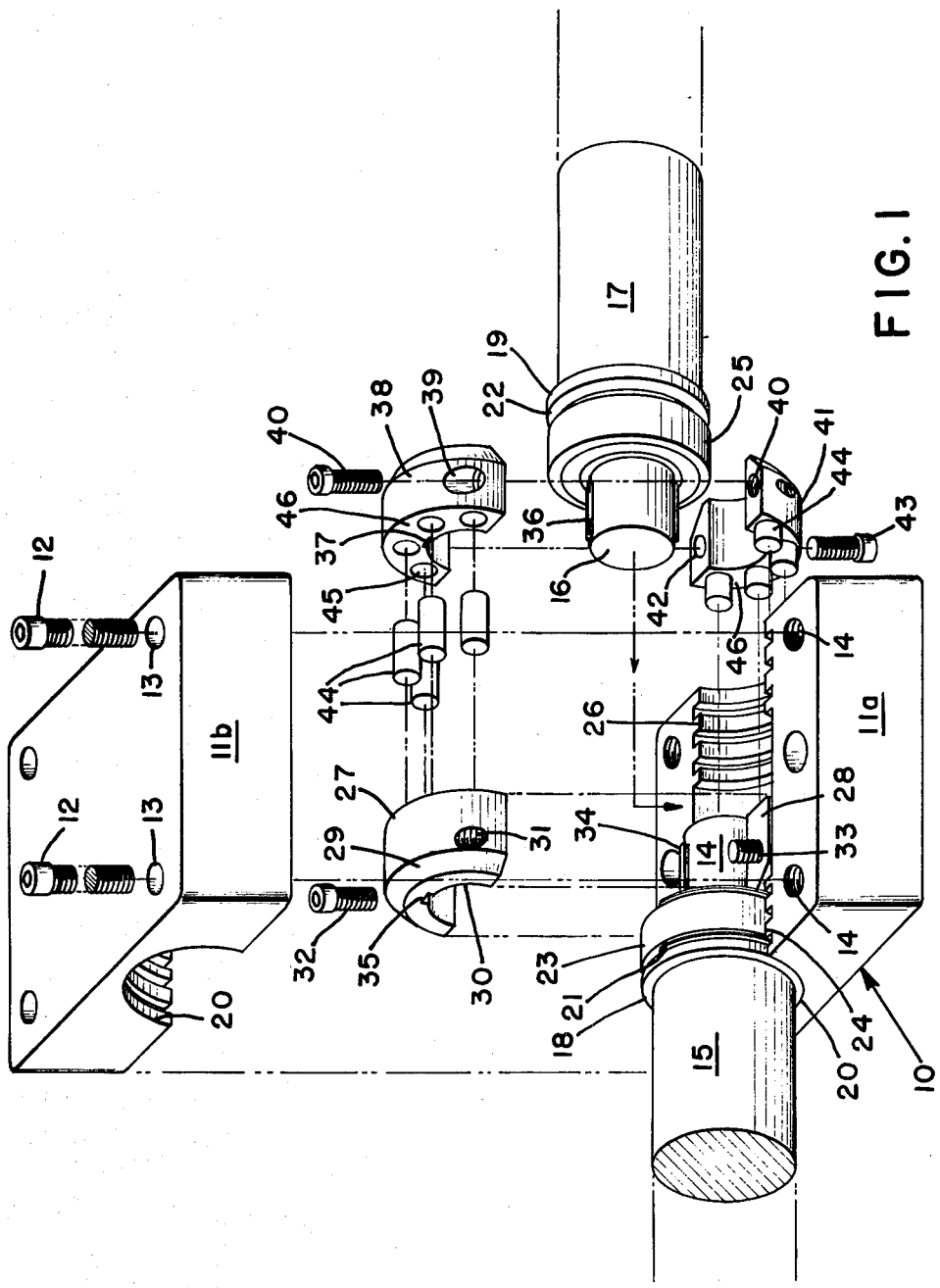
FIG. 1 is an exploded perspective view of the shaft coupling and components illustrating the present invention and the manner of assembly of the coupling.

Referring to the drawing as shown in FIG. 1, there is illustrated the improved shaft coupling 10 which will permit the non-axial displacement of a shaft relative to another shaft section in the coupling and in which the housing sections 11a and 11b are shown in vertically spaced relationship which, when assembled, will be securely fastened to each other by means of the Allen bolts 12 which pass through the spaced bolt bores 13 to be cooperatively received in the threaded openings 14 in the housing section 11a.

Each of the housing section interiors is substantially the same in order to complement each other and to cooperatively receive the various components in the shaft coupling including the shaft section 14 which is the end portion of the shaft 15 and shaft section 16 which is the end portion of shaft 17 to be coupled to rotate in unison. A plastic sleeve 18 is mounted on the shaft 15 and a similar plastic sleeve 19 is mounted on the shaft 17 to be cooperatively received within the arcuate section 20 provided in each of the housing sections 11a and 11b. A suitable steel spacer ring 21 is also mounted on the shaft 15 back of the plastic ring 18 and a similar steel ring 22 is mounted on shaft 17 behind the ring 19. A suitable bearing 23 which may be a roller or ball bearing having suitable raceways is seated in the bearing receiving slot 24 in the housing section 11a to support the shaft 15 for rotation. A similar bearing 25 is mounted on the shaft 17 to be seated in the corresponding slot 26 provided for it in the housing section 11a. Complementary slots for the bearings 23 and 25 are also provided in the housing section 11b.

A split collar having an upper collar section 27 and a lower collar section 28 has a cylindrical configuration with a chamfered end 29 and a shaft-receiving arcuate recess 30. A tapped or threaded opening 31 is positioned at one side of the section 27 and the other side opposite therefrom is provided with a bolt-receiving opening for cooperatively receiving the threaded bolt 32 therethrough. The threaded bolt 33 in the other half section 28 of the collar extends upwardly and upon suitable rotation will be threadably engaged in the threaded opening 31 of the section 27. The bolt 32 will engage threadably with a threaded opening that is positioned in the bottom section of the collar portion 28 for clamping engagement to the shaft section 14 which is provided with a key 34 which will cooperatively be seated into the keyway 35 in the upper collar section 27.

As shown in the right side of FIG. 1, the same type of split collar is utilized to be placed in juxtaposition with the split collar sections 27 and 28 mounted on the shaft section 16 which is also provided with a key 36 for seating in the keyway 37 in the upper split collar section 38. The upper collar section 38 is provided with a bolt-receiving opening 39 through which the threaded bolt 40 may pass to be threadably engaged with the threaded opening 40 in the bottom split section 41 of the collar. The bolt-receiving opening 42 in the lower split collar section 41 will cooperatively receive a bolt 43 therethrough for threaded engagement with a threaded opening (not shown) in the opposite side of the upper section 38 of the collar.

The upper and lower split collar sections 38 and 41 may be positioned on the section 16 of the shaft 17. A series of cylindrical locking and driving members or pins 44, each of which is insertable readily into one of the circumferentially spaced-apart cylindrical pin openings 45 that are suitably drilled in the split collar face side 46 and to be seated therein but project therefrom, is shown in the bottom split collar section 41 to be cooperatively received when positioned adjacent to similar openings in the split collar upper and lower sections 27 and 28 at the left side of FIG. 1.

It will be readily apparent that in assembling the shaft coupling of the present invention that the split collars 27 and 28, and 38 and 41 will have to be rotated to expose the bolt openings to remove or tighten them in position without displacing the shafts 15 and 17. In assembling the coupling arrangement, the split collar halves 28 and 41 may be positioned initially with the cylindrical pins 44 engaging their corresponding openings in the split collar face sides of each of the collar sections permitting the pins 44 to be seated properly. The shafts 15 or 17 with their respective end portions 14 or 16, may then be placed in position transverse to the axis of rotation. Thereafter, one of the upper sections of the split collars 27 or 38 may be mounted in position after registry with the appropriate key and keyways and the pins 44 appropriately positioned whether as a unit or individually. That is, the upper half sections 27 and 38 may have the pins 44 inserted in their respective openings 45 and the entire assembly positioned over the shaft sections 14 and 16 to cooperate and be releasably locked to the lower sections by adjusting the rotation of the split collar sections to expose the bolts for rotation into threaded engagement to lock them in position. With the shafts in position and the shaft coupling sections locked in proper position, the top housing section 11b may then be fastened to the lower section 11a of the housing by threaded engagement of the bolts 12 into the threaded openings 14 of the lower housing section 11a.

In the event of any defect in the shaft 15 or 17, the housing section 11b may be disengaged through the bolts 12 being removed to expose the coupling components and particularly the split collar assembly. By removing the bolts 40 and 43, with some rotation of the shafts, the split collar sections 38 and 41 may be removed preferably as a section with the upper portion 27 of the split collar section. Once the split collar sections are removed, the shaft 17 may be lifted vertically or non-axially from position and the bearing or shaft or other portions may be replaced without disturbing adjacent sections of the shaft in alignment with the shafts 15 and 17.

It will be readily apparent that various types of locking members may be employed in place of the cylindrical pins and the number of segments making up the split collar may vary depending upon the size of the shafts being utilized within the contemplation of this invention.

We claim:

1. A shaft coupling comprising at least a pair of releasably connected articulated complementary closure members and a shaft bearing housing, a shaft having a shaft end section bearingly supported in said base for rotation, a first split collar including at least a pair of complementary sections releasably mounted on and encircling said shaft end section, said first split collar having means for releasably securing said collar complementary sections together for retention on said shaft end section and said first collar having a shaft joining face side, said shaft joining face side having a plurality of cylindrical pin-receiving recesses, a second split collar including at least a pair of complementary sections for cooperatively retaining and encircling a shaft to be coupled, said second split collar having means for releasably securing said complementary sections together for retention on said shaft section to be coupled, in juxtaposition with said first surface, said second split collar having a shaft joining face side facing said first surface, said second split collar face side having a plurality of spaced cylindrical pin-receiving recesses, and a series of removable cylindrical pins forming locking means extending into said collar section recesses of said first and second split collars whereby shaft rotation of said first collar will transmit rotation to said second collar and coupled shaft which may be secured by said second collar and disengagement and removal of one split collar or portion thereof will provide for transverse displacement of a shaft end section in the coupling.

2. A shaft coupling as claimed in claim 1, said split collars each having a pair of semi-circular segments, and means for releasably locking said semi-circular segments together for releasable locking and retention on a shaft section.

3. A shaft coupling as claimed in claim 1, said split collars being freely rotatable in said base when mounted in position on shaft end sections.

* * * * *